United States Patent Office 3,352,829
Patented Nov. 14, 1967

3,352,829
POLYURETHANE FORMING COMPOSITIONS CONTAINING SULFUROUS ACID ESTERS AS RETARDING AGENTS
Friedrich Blomeyer and Wilfried Zecher, Cologne-Stammheim, and Hans Holtschmidt, Leverkusen, Germany, assignors to Farbenfabriken Bayer Aktiengesellschaft, Leverkusen, Germany, a corporation of Germany
No Drawing. Filed Feb. 9, 1965, Ser. No. 431,437
Claims priority, application Germany, Feb. 12, 1964, F 41,985
14 Claims. (Cl. 260—77.5)

ABSTRACT OF THE DISCLOSURE

Polyurethane coating compositions containing an ester of sulphurous acid having the formula $R_2SO_3$ wherein R is an alkyl or aryl radical and a method of retarding the reaction between an active hydrogen containing compound and an organic isocyanate are disclosed.

---

This invention relates to polyurethane plastics and more particularly to polyurethane compositions which have improved storage stability and in the case of polyurethane coating compositions improved pot-life.

It is well known to prepare polyurethane plastics by the reaction of compounds which contain active hydrogen atoms with an organic polyisocyanate. One of the many uses for polyurethane plastics is in polyurethane coating compositions. Polyurethane coating compositions are often made up of two components, one of which contains free isocyanato groups and another which contains free hydroxyl groups, said components being dissolved in an inert organic solvent therefor. The two components are not mixed until shortly before the coating composition is to be used, hence the term: "two component coating." The reaction between the organic isocyanate and the active hydrogen containing component which is usually a polyol begins shortly after mixing and results in a film on the surface on to which the mixture is applied on completion of the poly addition reaction. Owing to the progressive addition reaction, the viscosity slowly increases and after a short time the viscosity reaches a stage at which it is difficult or impossible to apply the coating composition to a substrate. This increase in viscosity means an unavoidably short pot-life. While it has been known heretofore to catalyze the reaction and produce a shorter pot-life, it has not been possible heretofore to lengthen the pot-life with other additives.

Since the pot-life is necessarily short, it has heretofore been essential to either use a solvent or suffer extremely short times in which the mixtures are suitable for application. It is particularly desirable to increase the pot-life where polyurethane compositions are desired that can be applied to a substrate even though they are not dissolved in a solvent. Furthermore, not all polyisocyanates react at the same rate so that some lead to a shorter pot-life than others. For example, when the polyisocyanate component is diisocyanato diphenyl methane, the pot-life of the resulting polyurethane coating based on a polyol may be only 15–30 minutes which leaves only a few minutes available for applying the polyurethane coating composition. It is often desirable to increase the pot-life even of these compositions which contain one or more of the components in a solvent.

It is, therefore, an object of this invention to provide a method of increasing the pot-life and/or stability of a polyurethane composition. Still a further object of this invention is to provide an improved method of increasing the pot-life of a polyurethane composition which is substantially free from solvents. Another object of this invention is to provide a method of increasing the pot-life of a solvent containing two component polyurethane coating composition. Still another object of this invention is to provide a method of slowing down the reaction between an organic polyisocyanate and an active hydrogen containing compound. Another object of this invention is to provide coating compositions which have improved reaction rates for application to substrates particularly when based on relatively reactive isocyanates. Still a further object of this invention is to provide improved polyurethane plastic based on isocyanates and active hydrogen containing compounds.

The foregoing objects and others are accomplished in accordance with this invention, generally speaking, by providing polyurethane plastics and components for the preparation thereof containing esters of sulphurous acids. Thus, this invention contemplates a method of retarding the reaction between an active hydrogen containing compound and an organic polyisocyanate. In other words, it has been found that the foregoing objects can be accomplished by the use of esters of sulphurous acid to increase the pot-life of polyurethane compositions. In accordance with a preferred embodiment of the invention, esters of sulphurous acids are used to increase the pot-life of two component polyurethane coating compositions including compositions where either the organic polyisocyanate component or the active hydrogen containing component including polyhydric polyesters, polyhydric polyethers and the like contain the sulphurous acid esters of the invention.

Any suitable ester of a sulphurous acid which preferably has the formula $R_2SO_3$ wherein R is an alkyl and preferably lower alkyl radical having 1–10 carbon atoms (the two radicals R can be substituted by one two-functional radical R which is attached to the sulphurous acid residue by two bonds such as in sulphurous acid ethylene ester) or aryl and preferably an aryl radical having only one benzene ring may be used. Examples of such sulphurous acid esters include sulphurous acid diethyl ester, sulphurous acid diphenyl ester, sulphurous acid ethylene ester, sulphurous acid-2,2-dimethyl propyl ester, sulphurous acid diisopropyl ester, sulphurous acid didecyl ester, sulphurous acid dihexyl ester, sulphurous acid dibutyl ester, sulphurous acid diheptyl ester, sulphurous acid ditolyl ester, sulphurous acid dixylyl ester, sulphurous acid phenyl ether ester, sulphurous acid dimethyl ester, sulphurous acid methyl ethyl ester, sulphurous acid ethyl isopropyl ester, sulphurous acid dinaphthyl ester, sulphurous acid dimethylene propylene ester and the like. The esters used according to the invention for increasing the pot-life or storage stability of a polyurethane composition may be added to any component going into the final reaction mixture. However, the esters are preferably added to the clear or if desired pigmented solvent containing or solvent-free polyol component and are effective as soon as they have been added. Even water present in the polyol in relatively minor amounts will be eliminated in 10 to 14 days at normal temperatures by hydrolysis in order to increase the pot-life of solvent containing or solvent-free polyurethanes. The esters of sulphurous acids are preferably used in quantities of from about 0.1 to 6% by weight and more preferably from about 2 to 4% by weight based on the total weight of the polyurethane composition.

The effect of esters of sulphurous acid in increasing the pot-life is distinctly greater than that obtained with corresponding amounts of solvents or toluene sulphonic acid. The preparation of the esters of sulphurous acid used according to the invention is carried out by known processes, e.g. by treating thionyl chloride with alcohols or phenols. Suitable alcohols are, for example, methanol, ethanol, propanol, butanol, isopropylalcohol, ethylene glycol and dimethylpropylene glycol. Suitable phenols are phenol, chlorophenol, cresol and alpha-naphthol.

Two component polyurethane coatings are obtained by combining polyisocyanates with polyhydroxyl compounds or their solutions shortly before use. Practically all polyisocyanates are suitable, as indicated, for example in Annalen 562, 75 (1949), e.g. hexamethylene diisocyanate and 2,4- and 2,6-toluylene diisocyanate as well as commercial and pure diphenylmethane-4,4'-diisocyanate. Instead of the simple polyisocyanates, it is possible to use relatively high molecular weight compounds which contain —NCO groups. Examples of such compounds are the reaction products of polyhydric alcohols such as ethylene glycol, diethylene glycol, butylene glycol, glycerol, trimethylolpropane, hexanetriol, propylene glycol and polyethylene glycol and of castor oil and of polyesters that contain hydroxyl groups and natural oils and fats that have been subjected to alcoholysis, with an excess of polyisocyanates, especially with hexamethylene diisocyanate, 2,4- and 2,6-toluylene diisocyanate and diphenylmethane diisocyanate.

It is also possible to use polyvalent polyisocyanates that are produced from polyvalent isocyanates, especially from diisocyanates, and small amounts of water with formation of biuret. Thus, for example, a biuret triisocyanate is obtained from 3 mols of hexamethylene diisocyanate and 1 mol of water. Further, polycarbodiimides having terminal free isocyanate groups are suitable for use as polyisocyanates which are prepared from polyisocyanates with catalysts such as phosphine oxides. Polyvalent polyisocyanates that have been obtained by di- or trimerization of diisocyanates may also be used.

It is also possible to use mixtures of the above mentioned polyvalent isocyanates with each other and to use polyisocyanates that are obtainable from diisocyanates and polybasic carboxylic acids.

Polyhydroxyl compounds suitable for the preparation of the two-component polyurethane coatings are, for example, polyhydric alcohols such as ethylene glycol, diethylene glycol, butylene glycol, glycerol, 1,2,6-hexanetriol, trimethylolpropane and pentaerythritol; mixtures of these alcohols, polyethers of these alcohols and ethylene oxide; polyesters containing hydroxyl groups, obtained from polyhydric alcohols or alcohol mixtures and di- or polybasic carboxylic acid such as succinic acid, malic acid, fumaric acid, maleic acid, phthalic acid, hexahydrophthalic acid, adipic acid and citric acid. Besides the polyhydroxyl compounds that contain primary hydroxyl groups, it is also possible to use those having mainly secondary hydroxyl groups. Compounds of this kind are, for example, castor oil, brominated or hydrogenated castor oil, reaction products of castor oil with polyhydric alcohols, 9-octadecene-1,12-diol, polyether alcohols of polyhydric alcohols and propylene oxide, epoxy resins of polyhydric alcohols or phenols with epichlorohydrin. Also suitable are polythioether alcohols and polyacetals, silicone resins and phenol formaldehyde condensates having free hydroxyl groups.

Polyisocyanate and polyhydroxyl compounds, possibly in dissolved form, are usually mixed in such a ratio shortly before use, that the resulting NCO:OH ratio is 1.0–1.2:1. Deviations from this ratio are possible. In the case of the production of pigmented polyurethane varnishes, trituration is carried out only with the polyhydroxyl compound, if desired in the form of solution. The usual pigments and fillers may be used. The intensity of pigmentation may be chosen as desired and may, if necessary, be up to 1000% calculated on the solid polyurethane.

The same substantially anhydrous solvents may be used as are used in the preparation of two-component polyurethane coatings, e.g. cyclohexane, ethyl glycol acetate, methyl isobutylketone, methyl ethyl ketone, butyl acetate, toluene and xylene. The polyurethane coatings are worked up by the processes usually employed in the art.

In addition to the foregoing coating compositions and polyols, polyisocyanates and the like employed in their preparation, it is to be understood that this invention also contemplates other reaction products where it is desirable to retard the reaction between an organic polyisocyanate and an active hydrogen containing compound. Applications of this sort may include the preparation of polyurethane caulks and sealants and/or polyurethane elastomers. For this purpose a vast number of compounds are contemplated for reaction to prepare caulks, sealants, elastomers and the like including any suitable compound containing active hydrogen containing groups as determined by the Zerewitinoff method and any suitable organic isocyanate. The following are merely illustrative of the vast number of compounds which may be used and for the reaction with the polyisocyanates which are also forth below in some detail.

Any suitable compound containing terminal hydroxyl groups may be used in the process of this invention to prepare the caulking compositions such as, for example, hydroxyl polyesters, polyhydric polyalkylene ethers, polyhydric polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyladipic acid, glutaric acid, pimelic acid, azelaic acid, phthalic acid, terephthalic acid, isophthalic acid, 1,2,4-benzene tricarboxylic acid, thiodipropionic acid, maleic acid, fumaric acid, citraconic acid, itaconic acid, and the like. Any suitable polyhydric alcohol may be used in the reaction with the polycarboxylic acid to form a polyester such as, for example, ethylene glycol, propylene glycol, butylene glycol, amylene glycol, hexanediol, hexanetriol, glycerine, bis-(hydroxy-methyl-cyclohexane), trimethylolpropane, pentaerythritol and the like. The hydroxyl polyester should have a molecular weight of at least about 500 and not greater than about 5,000 and an hydroxyl number of from about 40 to about 225. It is preferred, however, that the molecular weight of the polyester as well as any of the polyhydroxyl bearing compounds utilized in the process of this invention be from about 800 to about 4,000. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of an amine or an amino alcohol with any of the compositions set forth for preparing polyesters. Any suitable amine may be used such as, for example, ethylene diamine, propylene diamine, tolylene diamine, and the like. Any suitable amino alcohol such as, for example, beta-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid, such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane, 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylolpropane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(beta-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

As stated above, the organic compound containing terminal hydroxyl groups should have a molecular weight of from about 500 to about 5,000 with the range of from about 800 to about 4,000 being preferred. Although hydroxyl terminated compounds having a functionality greater than 2 may be used, such as, for example, the polyesters prepared by reacting trifunctional glycols or tricarboxylic acids, it is preferred to use substantially linear hydroxyl terminated compounds.

Any suitable diamine may be used in the process of this invention to prepare a caulking composition such as, for example, m-phenylene diamine, tolylene-2,4-diamine, 4,4' - diaminodiphenylmethane, 4,4' - methylene-bis(2-chloroaniline), 4,4'-diamino-3,3'-diethoxydiphenylmethane, p-phenylenediamine, tolylene-2,6-diamine, 4-methoxy-m-phenylenediamine, 2-methoxy-m-phenylenediamine, 4-chloro-m-phenylenediamine, 2-chloro-m-phenylenediamine, 4-bromo-m-phenylenediamine, 4-ethoxy-m-phenylenediamine, 2-ethoxy - m - phenylenediamine, 4-phenoxy - m - phenylenediamine, 2,4' - diaminodiphenylether, 4,4'-diaminodiphenylether, cumene-2,4-diamine, cumene-2,6-diamine, 5,6 - dimethyl-m-phenylenediamine, 2,3-dimethyl-p-phenylenediamine, 2,4-dimethyl-m-phenylene-diamine, 4,6-dimethyl-m-phenylenediamine, 3,6-dimethyl-p-phenylenediamine, 1,4-anthracenediamine, 9,10 - anthracenediamine, 2,2' - diaminodibenzyl, 4,4'-diaminodibenzyl, 3,4'-diaminobenzyl, 4,4'-diamino-3,3'-dimethyltriphenylmethane, 4,4'-diamino-2,2'-dimethyldiphenyl, 4,4'-diamino-2,6-dimethyldiphenyl, 2,4'-diaminodiphenyl, benzidine, 2,6-diaminobenzfuran, 2,5-fluorenediamine, 2,4-stilbenediamine, o-dianisidine, p-dianisidine, 1,4-naphthalenediamine, 1,8-naphthalenediamine, 2,6-naphthalenediamine, ethylenediamine, propylenediamine, butylenediamine, hexamethylenediamine and the like. It is preferred, however, that the aromatic diamines be used. Best results are obtained utilizing tolylene diamine, 4,4'-methylene-bis-(2-chloroaniline) and 4,4'-diaminodiphenylmethane. A small quantity of monoamine or a higher functional polyamine may be used in admixture with the diamine in the process of this invention. Suitable monoamines include such as, for example, ethylamine, propylamine, aniline and the like. Higher functional amines include 4,4',4"-triaminotriphenylmethane, 2,4,6-triaminotoluene, 4,4',4",4"'-tetra-aminotriphenylmethane and the like.

Any suitable organic polyisocyanate may be used in the preparation of the caulking composition in accordance with this invention, such, as for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6-toluylene diisocyanate, 4,4'-diphenylmethane diisocyanate, 2,2 - diphenylpropane - 4,4'-diisocyanate, p-phenylene diisocyanate, m-phenylene diisocyanate, xylylene diisocyanate, 1,4-naphthylene diisocyante, 1,5-naphthylene diisocyanate, diphenyl-4,4'-diisocyanate, azobenzene - 4,4' - diisocyanate, diphenylsulphone - 4,4' - diisocyanate, dichlorohexamethylene diisocyanate, furfurylidene diisocyanate, 1-chlorobenzene-2,4-diisocyanate, 4,4',4" - triisocyanato - triphenylmethane, 1,3,5 - triisocyanato-benzene, 2,4,6 - triisocyanatotoluene, 4,4' - dimethyldiphenylmethane - 2,2',5,5'-tetraisocyanate and the like. Also suitable for use as the organic polyisocyanates are the reaction products of any of the hydroxyl terminated compounds mentioned above with an excess of an organic diisocyanate such as those set forth immediately above. A particularly suitable polyisocyanate of this class is one prepared by reacting a mixture of a polypropylene ether glycol having a molecular weight of about 2,000 and a polyethertriol obtained from glycerine and propylene oxide and having a molecular weight of about 3,000 with a mixture of 80% 2,4- and 20% 2,6-toluylene diisocyanate to obtain an isocyanate modified prepolymer. Of course, these —NCO terminated prepolymers are also liquid at ambient temperatures.

The caulking compositions prepared in accordance with this invention are suitable for any application where it is desired to caulk or fill in voids for the purpose of obtaining a smooth, uniform appearance or for the purpose of rendering an object water-tight and for any other applications where caulks and sealants are used. For example, the compositions in accordance with this invention may be used for filling in cracks and holes in walls prepared from any of the known building materials, such as concrete blocks, plaster, wood and the like. The compositions are also suitable in sealing and filling in voids in steel walls such as bulkheads in ships. The compositions prepared in accordance with this invention find particular utility in the caulking of boats to render them water-tight because of the properties exhibited by the material with respect to resistance to the action of water.

The polyurethanes are useful where polyurethanes have been used heretofore in addition to other uses where longer reaction times are desirable for example, for coating wood, metal and the like as well as caulking cracks in walls, window frames and the like.

The invention is further illustrated by the following examples in which parts are by weight unless otherwise specified.

*Example 1*

About 100 parts of a polyester of adipic acid, phthalic acid and trimethylolpropane, about (8.8% OH) are dissolved in about 200 parts of a solvent mixture consisting of cyclohexanone, ethyl glycol acetate, methyl isobutyl ketone, methylethylketone, xylene in the ratio of 1:1:1:1:1. To this is added a solution of about 200 parts of an epoxy resin based on diphenylolpropane and epichlorohydrin (epoxy value 0.028) in about 500 parts of the given solvent mixture. About 155 parts of a 20% solution of polyvinyl butyral are then stirred into the said solvent mixture. The solution obtained is treated with the agents according to the invention for increasing the pot-life and with about 425 parts of a 75% solution of a polyisocyanate of about 3 mols. toluylene diisocyanate and about 1 mol trimethylolpropane.

| Additives (calculated on the solids content): | Pot-life, hours |
|---|---|
| Without additive | 32 |
| 2% sulphurous acid diethyl ester | 48 |
| 2% sulphurous acid diphenyl ester | 68 |
| 4% sulphurous acid ethylene ester | 56 |
| 4% sulphurous acid dimethylpropylene ester | 48 |

*Example 2*

A solution of about 100 parts of a polyester of trimethylolpropane and phthalic acid (8.9% OH) in about 125 parts of methyl ethyl ketone and about 100 parts of ethyl glycol acetate is mixed with a solution of about 100 parts of a low viscosity alkyd resin (4% OH), modified with saturated fatty acids, in about 100 parts of ethyl glycol acetate and then treated with about 4.5 parts of a 10% solution of zinc octoate in toluene and with about 40 parts of butyl acetate (anhydrous) and about 70 parts of ethyl glycol acetate.

The solution obtained is treated with the agents according to the invention for increasing the pot-life. The solution obtained is treated with about 186 parts of a 75% solution of a polyisocyanates with biuret structure obtained from about 3 mols. of hexamethylene diisocyanate and about 1 mol of water (DBP 1,101,394) in ethyl glycol acetate/xylene (1:1).

| Additives (calculated on the solids content): | Pot-life, hours |
|---|---|
| Without additive | 10 |
| 2% sulphurous acid diethyl ester | 36 |
| 2% sulphurous acid ethylene ester | 36 |
| 2% sulphurous acid dimethylpropylene ester | 40 |

*Example 3*

About 300 parts of castor oil are mixed with about 300 parts of a propoxylated trimethylolpropane (OH number 379). The mixture obtained is treated with the agents according to the invention for increasing pot-life. About 450 parts of commercial liquid 4,4'-diphenylmethane diisocyanate are then added with thorough stirring. The polyurethane composition hardens with formation of foam.

| Additives (calculated on the solids content): | Pot-life, minutes |
|---|---|
| Without additive | 46 |
| 4% ethyl glycol acetate | 55 |
| 2% sulphurous acid diethyl ester | 74 |
| 4% sulphurous acid dimethylpropylene ester | 61 |

*Example 4*

The following components are intimately mixed: about 282 parts of castor oil (first pressing), about 300 parts of propoxylated trimethylolpropane (OH number about 379), about 36 parts of sodium alumosilicate with a zeolite structure and about 3 parts of a sulphonated copolymer of styrene and divinylbenzene. The mixture is then treated with the agents according to the invention for increasing pot-life.

About 450 parts of commercial 4,4'-diphenylmethane diisocyanate are added with thorough stirring. The polyurethane composition obtained hardens without foam formation.

| Additives (calculated on the solids content): | Pot-life, minutes |
|---|---|
| Without additive | 53 |
| 4% ethyl glycol acetate | 60 |
| 2% sulphurous acid dimethyl propylene ester | 80 |
| 2% sulphurous acid diethyl ester | 78 |
| 4% sulphurous acid diisopropyl ester | 78 |
| 4% sulphurous acid diphenyl ester | 80 |
| 4% sulphurous acid ethylene ester | 80 |

*Example 5*

Pigments and fillers are made up into a paste with a mixture of castor oil and polypropylene oxide and thoroughly mixed on a kneader. The mixture contains the following constituents:

| | Parts |
|---|---|
| Commercial castor oil | 6.5 |
| Propoxylated trimethylolpropane (OH number 379) | 7.9 |
| Quartz powder | 15.7 |
| Quartz sand | 53.0 |
| Manganese blue | 5.7 |

The agents according to the invention for increasing pot life and if desired chemical water destroying agents such as orthoformic acid ester or physical water absorbing agents such as sodium alumosilicate with a zeolite structure are also added. About 11.2 parts of commercial liquid 4,4'-diphenylmethane diisocyanate are then added with thorough stirring and the pot life determined.

| Additives (calculated on about 100 parts of paste and diisocyanate): | Pot-life, minutes |
|---|---|
| 1. Without additive | 35 |
| 2. 3 parts of sodium alumosilicate | 30 |
| 3. 3 parts of orthoformic acid ethyl ester | 40 |
| 4. 3 parts of sulphurous acid diethyl ester | 80 |
| 5. 3 parts of sodium alumosilicate, and 2 parts of sulphurous acid diethyl ester | 110 |
| 6. 3 parts of sodium alumosilicate, and 3 parts of sulphurous acid diethyl ester | 100 |
| 7. 3 parts of orthoformic acid ethyl ester, and 2 parts of sulphurous acid diethyl ester | 150 |
| 8. 3 parts of orthoformic acid ethyl ester, and 3 parts of sulphurous acid diethyl ester | 110 |
| 9. 1.5 parts of orthoformic acid ethyl ester, and 1.5 parts of sulphurous acid diethyl ester | 100 |
| 10. 3 parts of sulphurous acid diisopropyl ester | 80 |
| 11. 3 parts of sodium alumosilicate, and 3 parts of sulphurous acid diisopropyl ester | 75 |
| 12. 3 parts of orthoformic acid ethyl ester, and 3 parts of sulphurous acid diisopropyl ester | 120 |
| 13. 1.5 parts of orthoformic acid ethyl ester, and 1.5 parts of sulphurous acid diisopropyl ester | 110 |
| 14. 3 parts of sulphurous acid ethylene ester | 90 |
| 15. 3 parts of orthoformic acid ethyl ester, and 3 parts of sulphurous acid ethylene ester | 150 |
| 16. 1.5 parts of orthoformic acid ethyl ester, and 1.5 parts of sulphurous acid ethylene ester | 110 |
| 17. 3 parts of sodium alumosilicate, and 3 parts of sulphurous acid ethylene ester | 110 |
| 18. 1.5 parts of sodium alumosilicate, and 1.5 parts of sulphurous acid ethylene ester | 80 |
| 19. 3 parts of sulphurous acid dimethylpropylene ester | 90 |
| 20. 3 parts of sodium alumosilicate, and 3 parts of sulphurous acid dimethylpropylene ester | 110 |
| 21. 1.5 parts of sodium alumosilicate, and 1.5 parts of sulphurous acid dimethyl propylene ester | 90 |
| 22. 3 parts of orthoformic acid ethyl ester, and 3 parts of sulphurous acid dimethylpropylene ester | 150 |
| 23. 1.5 parts of orthoformic acid ethyl ester, and 1.5 parts of sulphurous acid dimethylpropylene ester | 110 |
| 24. 3 parts of sulphurous acid diphenyl ester | 80 |
| 25. 5 parts of sulphurous acid diphenyl ester | 90 |
| 26. 3 parts of sodium alumosilicate, and 3 parts of sulphurous acid diphenylester | 110 |
| 27. 3 parts of toluene sulphonic acid | 30 |

It is to be understood that the foregoing examples are given for the purpose of illustration and that any other suitable sulphurous acid ester, organic isocyanate, active hydrogen containing component and the like could be used provided that the teachings of this disclosure are followed.

Although the invention has been described in considerable detail for the purpose of illustration, it is to be understood that variations may be made therein by those skilled in the art without departing from the spirit of the invention and scope of the claims.

What is claimed is:

1. A method of retarding the reaction between an organic isocyanate and an organic compound containing active hydrogen containing groups as determined by the Zerewitinoff method which comprises mixing said isocyanate and said active hydrogen containing compound with an ester of sulphurous acid having the formula $R_2SO_3$ wherein R is alkyl or aryl.

2. The method of claim 1 wherein R is a lower alkyl radical having from 1 to 10 carbon atoms.

3. The method of claim 1 wherein said organic compound containing active hydrogen containing groups is a polyhydric alcohol.

4. The method of claim 1 wherein said isocyanate is an organic polyisocyanate.

5. The method of claim 1 wherein said ester of sulphurous acid is employed in an amount of from about 0.1 to 6% by weight based on the weight of the reactants.

6. An improved coating composition which comprises a mixture of an organic polyisocyanate, an organic compound containing active hydrogen containing groups as determined by the Zerewitinoff method and an ester of sulphurous acid having the formula $R_2SO_3$ wherein R is alkyl or aryl.

7. A composition of claim 6, wherein the ester of sulphurous acid is sulphurous acid diethylester.

8. A composition of claim 6, wherein the ester of sulphurous acid is sulphurous acid diphenylester.

9. A composition of claim 6, wherein the ester of sulphurous acid is sulphurous acid ethylene ester.

10. A composition of claim 6, wherein the ester of sulphurous acid is sulphurous acid dimethyl propylene ester.

11. A composition of claim 6, wherein the ester of sulphurous acid is sulphurous acid diisopropylester.

12. A two-component coating composition, one component comprising an organic polyisocyanate and the other component comprising an organic compound containing active hydrogen containing groups as determined by the Zerewitinoff method, at least one of said components containing an ester of sulphurous acid having the formula $R_2SO_3$ wherein R is alkyl or aryl in an amount of from 0.1 to 6% by weight based on the total weight of both components.

13. The coating composition of claim 12 wherein said organic polyisocyanate is 4,4'-diphenylmethane diisocyanate.

14. The coating composition of claim 12 wherein said components are mixed in an inert organic solvent therefor.

References Cited

FOREIGN PATENTS 1,131,002  12/1962  Germany.

DONALD E. CZAJA, *Primary Examiner.*

C. W. IVY, *Assistant Examiner.*